J. R. FLEMING.
CAR WHEEL AND AXLE.
APPLICATION FILED MAY 1, 1912.
1,056,525.
Patented Mar. 18, 1913.
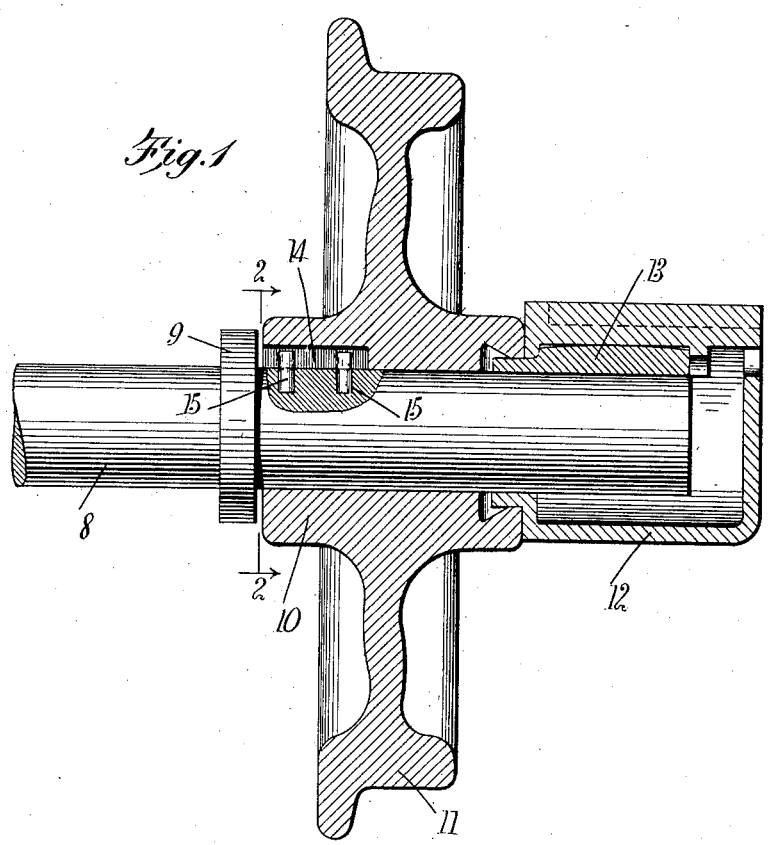
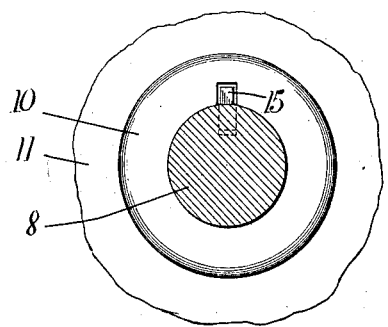
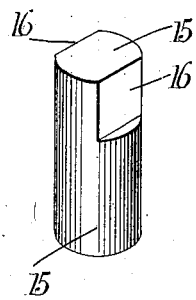
WITNESSES
F. D. Sweet,
C. F. Murdock
INVENTOR
James R. Fleming
BY Munn & Co
ATTORNEYS

UNITED STATES PATENT OFFICE.

JAMES R. FLEMING, OF SCRANTON, PENNSYLVANIA.

CAR WHEEL AND AXLE.

1,056,525.  Specification of Letters Patent.  Patented Mar. 18, 1913.

Application filed May 1, 1912. Serial No. 694,464.

*To all whom it may concern:*

Be it known that I, JAMES R. FLEMING, a citizen of the United States, and a resident of Scranton, in the county of Lackawanna and State of Pennsylvania, have invented a new and Improved Car Wheel and Axle, of which the following is a full, clear, and exact description.

Among the principal objects which the present invention has in view are: to provide means for holding the axle and wheels of a car in non-rotative relation; to provide means for permitting wheels mounted non-rotatively on an axle to slide thereon within a limited area to permit the lateral shift of the wheels to accommodate the adjustment thereof to structural peculiarities of the roadbed; and to simplify and economize the construction.

Reference is to be had to the accompanying drawings forming a part of this specification, in which similar characters of reference indicate corresponding parts in all the views, and in which—

Figure 1 is a vertical section taken on the median line of a wheel axle constructed and arranged in accordance with the present invention; Fig. 2 is a cross section taken on the line 2—2 in Fig. 1; and Fig. 3 is a detail view, on enlarged scale, of a guide pin employed in the present invention.

The particular service in which the wheels and axles constructed and arranged in accordance with the present invention are employed is in the construction of mining cars, or cars for use in mines. This service is peculiarly difficult, in that the cars are subject to misuse; are operated in localities where the accumulation of grit is difficult to avoid; and, consequently, where the wear of the parts is excessive. It, therefore, becomes necessary that some provision be made for the wear of the parts, and for the replacement of the worn parts, with the minimum of cost.

Heretofore, where the wheels have been shrunk on the axles, or rigidly keyed thereon, the wear of the wheel has necessitated extensive handling of the axle and the wheels mounted thereon, or, in the event of excessive wear not admitting of repair, the discarding of the axle has been involved in the discarding of the worn wheel or wheels. This feature in the construction and operation of railway systems, where the wheels and axles have been thus constructed and arranged, has entailed the expenditures of considerable sums, in time equaling or exceeding the original cost of the equipment. It is principally to avoid this element of cost and the disadvantage occasioned by the need of repair that I have invented the present construction.

As shown in the accompanying drawings, particularly in Fig. 1 thereof, the axle 8 is provided with an integral thrust collar 9. The collar 9 is provided to bear against the end of the inner side of the hub 10 of a wheel 11. The load is carried by the axle 8, being imposed thereon by a journal box 12 and the bearing seat 13 thereof. The box 12 is disposed at the outside of the wheel 11, and the collar 9 at the inside of the wheel 11. The inner wall of the box 12 forms a thrust member for limiting the slide of the wheel on the axle 8 in one direction, while the collar 9 limits the slide of said wheel on the axle in the opposite direction. In practice, I arrange that the axle 8 shall provide for a suitable play between the inner face of the hub 10 of the wheel and the collar 9 of the axle. Allowing this lateral movement of the wheel on the axle permits the wheel to adjust itself to irregularities in the rails of the track-bed on which the car is operated, and to accommodate the frogs or switches with which the railway system is provided. This adjustment of the wheels permitting the one which strikes to move independently of the axle, avoids the riding of the wheel on the rail, and the consequent derailment of the car.

The car wheel 11 and the hub 10 thereof, in the present invention, are provided with a cast groove 14. The groove 14 extends any suitable distance within the hub, opening through the inner end of the hub, to, in service, be disposed adjacent the collar 9. The axle 8 is bored adjacent the collar 9 to receive short pins or dowels 15. The exposed end of each of the dowels 15 is reduced by forming thereon flattened surfaces 16, which surfaces bear against the sides of the groove 14, and prevent the turning, in use, of the dowels 15.

When an axle and wheel are constructed as herein shown and described, it will be found that the wheel is free to move laterally on the axle, to accommodate the irregularities or exigencies of the rails of the trackbed, and that the wear incident to such lateral movement is borne upon the pins 15, hence, when there has been any undue wear, the car may be jacked, and the axle 8 being freed from the box 12, the wheel 11 may be outwardly drawn from the axle and the engagement with the pins 15. The pins 15 being exposed, the old pins may be removed and new ones substituted therefor. This operation is rapid, thereby economizing in the usual time required for repair, and the cost of the pins 15 being nominal, the total cost of the repair is minimized.

While I have shown herein a structure employing two pins 15, it will be understood that I am not limited to such a structure, one pin performing the required service. While the form of axle employed in the above description to exploit the invention has a thrust collar to limit the lateral movement of the wheel, it will be understood that I do not confine myself to such use as the collar may be dispensed with and the pin 15 be used to limit the play of the wheel. Also it will be understood that while I have shown in the drawing and described the construction employing two pins 15, I, in some instances, employ only one pin.

Further, it should be understood that this invention is applicable to constructions in which the bearing or journal is disposed inside the wheels.

Having thus described my invention, I claim as new and desire to secure by Letters Patent:

The combination of an axle having a relative elongated journal section, said section having a plurality of spaced apart, alined, socket-bores, a wheel having a hub provided with a longitudinally disposed end-opening groove, and a plurality of round-bodied dowels to seat within said bores, said dowels being reduced at the exposed ends to snugly fit within said groove and to form straight, parallel surfaces to guide said wheel in its lengthwise movement on said journal.

In testimony whereof I have signed my name to this specification in the presence of two subscribing witnesses.

JAMES R. FLEMING.

Witnesses:
JAMES B. LAWLER,
PATRICK J. McLEARN.

---

Copies of this patent may be obtained for five cents each, by addressing the "Commissioner of Patents, Washington, D. C."